(12) United States Patent
Tsukamoto

(10) Patent No.: US 12,638,303 B2
(45) Date of Patent: May 26, 2026

(54) APPARATUS, METHOD, AND COMPUTER PROGRAM FOR GENERATING MAP

(71) Applicant: TOYOTA JIDOSHA KABUSHIKI KAISHA, Toyota (JP)

(72) Inventor: Mamoru Tsukamoto, Bunkyo-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/515,730

(22) Filed: Nov. 1, 2021

(65) Prior Publication Data

US 2022/0155097 A1　May 19, 2022

(30) Foreign Application Priority Data

Nov. 16, 2020　(JP) ................................. 2020-190180

(51) Int. Cl.
　　*G01C 21/00*　　(2006.01)
　　*G01C 21/32*　　(2006.01)
(52) U.S. Cl.
　　CPC ......... *G01C 21/3822* (2020.08); *G01C 21/32* (2013.01); *G01C 21/3852* (2020.08); *G01C 21/3867* (2020.08)
(58) Field of Classification Search
　　None
　　See application file for complete search history.

(56) References Cited

U.S. PATENT DOCUMENTS

| | | | |
|---|---|---|---|
| 10,664,709 | B2 | 5/2020 | You |
| 11,195,418 | B1 * | 12/2021 | Hong ................. G01C 21/3602 |
| 11,537,134 | B1 * | 12/2022 | Wiest ................... G06N 3/0455 |

| | | | |
|---|---|---|---|
| 11,555,706 | B1 * | 1/2023 | Levihn ................. G05D 1/0088 |
| 2004/0210383 | A1 | 10/2004 | Sato |
| 2006/0217879 | A1 * | 9/2006 | Ikeuchi .............. G01C 21/3844 |
| | | | 701/409 |

(Continued)

FOREIGN PATENT DOCUMENTS

| | | |
|---|---|---|
| CN | 107953882 A | 4/2018 |
| JP | 2003-65781 A | 3/2003 |

(Continued)

OTHER PUBLICATIONS

Itonaga, W., Matsuda, I., Yoneyama, N. and Ito, S. (2003), Automatic extraction of road networks from map images. Electron. Comm. Jpn. Pt. II, 86: 62-72. https://doi.org/10.1002/ecjb.10144 (Year: 2003).*

(Continued)

*Primary Examiner* — Faris S Almatrahi
*Assistant Examiner* — Selena M Jin
(74) *Attorney, Agent, or Firm* — Sughrue Mion, PLLC

(57)　　　　ABSTRACT

An apparatus for generating a map includes a processor configured to detect road areas representing roads from a bird's-eye view image, detect skeletal lines of the road areas and detects individual branch points of the skeletal lines as candidates for the centers of intersections, detect candidate intersection areas for the respective candidates for the centers of intersections from the bird's-eye view image, and detect two or more of the candidate intersection areas that at least partially overlap each other as a single intersection area. The candidate intersection areas respectively include the candidates for the centers.

17 Claims, 7 Drawing Sheets

(56) References Cited

U.S. PATENT DOCUMENTS

| | | | | |
|---|---|---|---|---|
| 2007/0014488 | A1* | 1/2007 | Chen | G01C 21/3807 |
| | | | | 382/294 |
| 2013/0328924 | A1* | 12/2013 | Arikan | G06T 11/00 |
| | | | | 345/629 |
| 2016/0102986 | A1* | 4/2016 | Ma | G01C 21/3841 |
| | | | | 702/5 |
| 2019/0205640 | A1* | 7/2019 | Zhan | G06V 30/422 |
| 2020/0073977 | A1* | 3/2020 | Montemerlo | G06F 16/9024 |
| 2020/0124725 | A1* | 4/2020 | Qiu | G01S 17/89 |
| 2020/0134354 | A1* | 4/2020 | Viswanathan | G06V 20/588 |
| 2020/0164872 | A1* | 5/2020 | Yanagihara | B62D 15/025 |
| 2020/0166371 | A1* | 5/2020 | Fitchett | G01C 21/3889 |
| 2020/0200542 | A1* | 6/2020 | Viswanathan | G06V 10/82 |
| 2020/0226175 | A1* | 7/2020 | Codevilla | G06F 16/58 |
| 2020/0256698 | A1* | 8/2020 | Shi | G01C 21/3867 |
| 2020/0278210 | A1* | 9/2020 | Nomura | G01C 21/3691 |
| 2020/0286256 | A1* | 9/2020 | Houts | G06F 18/2413 |
| 2020/0327707 | A1* | 10/2020 | Furger | G01S 19/51 |
| 2021/0302960 | A1* | 9/2021 | McGill, Jr. | G06N 3/0455 |
| 2021/0342586 | A1* | 11/2021 | Fleisig | G06V 10/34 |
| 2022/0412770 | A1* | 12/2022 | Li | G01C 21/3807 |

FOREIGN PATENT DOCUMENTS

| | | |
|---|---|---|
| JP | 2010-26326 A | 2/2010 |
| JP | 2010-236996 A | 10/2010 |
| JP | 2010-276553 A | 12/2010 |
| JP | 2017-054346 A | 3/2017 |
| JP | 2019-101256 A | 6/2019 |
| JP | 2019-121260 A | 7/2019 |
| JP | 2020-8681 A | 1/2020 |
| JP | 2020-038365 A | 3/2020 |

OTHER PUBLICATIONS

J. Dai, Y. Wang, W. Li and Y. Zuo, "Automatic Method for Extraction of Complex Road Intersection Points From High-Resolution Remote Sensing Images Based on Fuzzy Inference, " in IEEE Access, vol. 8, pp. 39212-39224, 2020, doi: 10.1109/ACCESS. 2020.2974974. (Year: 2020).*

Ying Wang, Qinfen Zheng, Recognition of roads and bridges in SAR images, Pattern Recognition, vol. 31, Issue 7, 1998, pp. 953-962, ISSN 0031-3203, https://doi.org/10.1016/S0031-3203(97)00098-8. (Year: 1998).*

J. Yuan, G. Lu, P. Friedrich and Y. Xu, "Real-time long-range road estimation in unknown environments," 2020 IEEE Intelligent Vehicles Symposium (IV), Las Vegas, NV, USA, 2020, pp. 83-88, doi: 10.1109/IV47402.2020.9304799. (Year: 2020).*

A. Plebe and M. D. Lio, "On the Road With 16 Neurons: Towards Interpretable and Manipulable Latent Representations for Visual Predictions in Driving Scenarios, " in IEEE Access, vol. 8, pp. 179716-179734, 2020, doi: 10.1109/ACCESS.2020.3028185. (Year: 2020).*

C. Ye, J. Li, H. Jiang, H. Zhao, L. Ma and M. Chapman, "Semi-Automated Generation of Road Transition Lines Using Mobile Laser Scanning Data," in IEEE Transactions on Intelligent Transportation Systems, vol. 21, No. 5, pp. 1877-1890, May 2020, doi: 10.1109/TITS.2019.2904735. (Year: 2020).*

* cited by examiner

F I G. 1
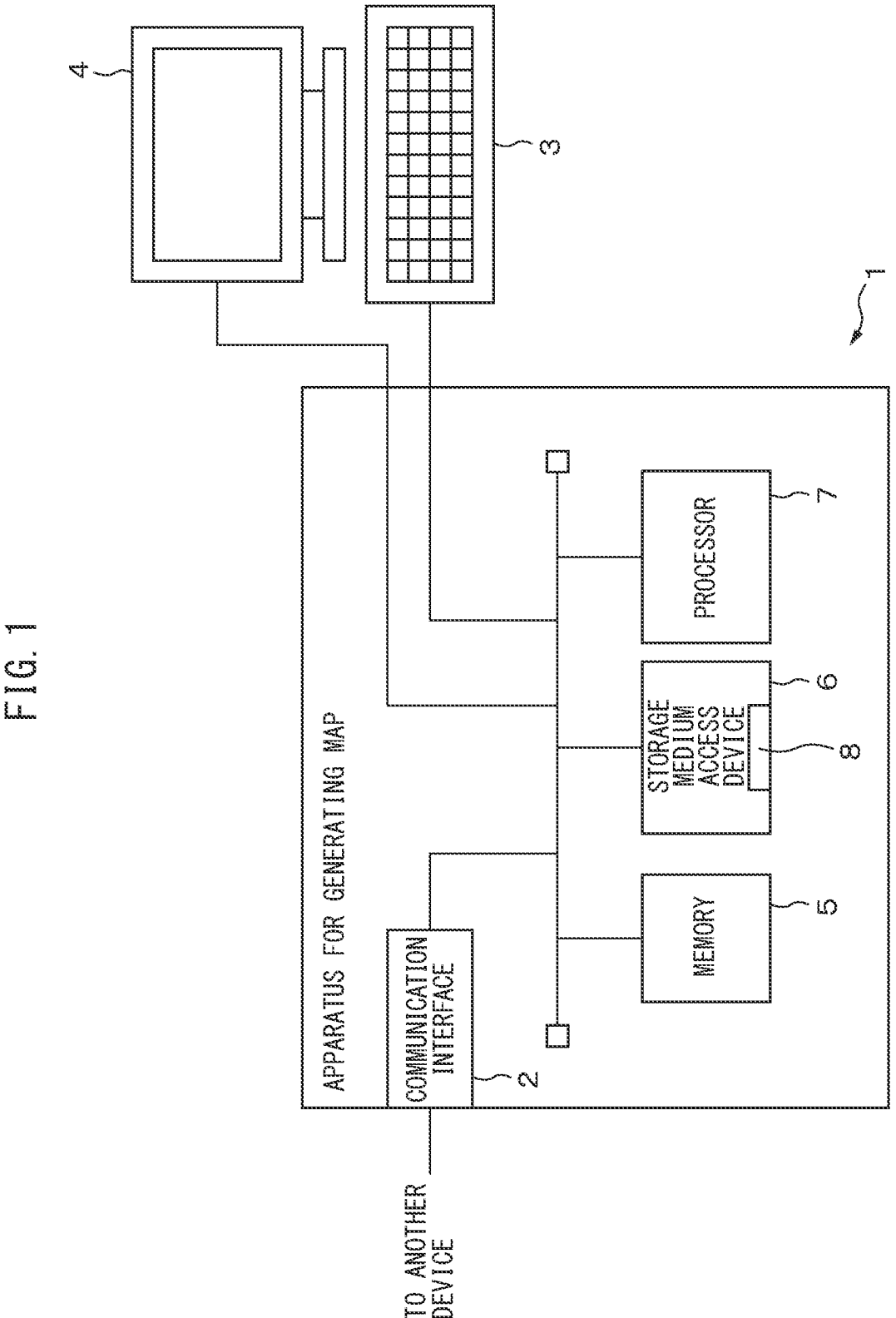

APPARATUS, METHOD, AND COMPUTER PROGRAM FOR GENERATING MAP

FIELD

The present invention relates to an apparatus, a method, and a computer program for generating a map from an image.

BACKGROUND

A technique has been proposed to generate a map including information used for automatically driving a vehicle from an image representing roads (see, Japanese Unexamined Patent Publication No. 2020-38365). A device for generating travel trajectory data in an intersection disclosed in Japanese Unexamined Patent Publication No. 2020-38365 recognizes a road marking in the intersection using captured image data of the intersection, and generates, in response to the result of recognition, travel trajectory data that enables specification of a travel trajectory for autonomous driving in the intersection.

SUMMARY

In the above-described technique, the travel trajectory data is generated on the basis of the result of recognition of a road marking in an intersection. However, some intersections do not have road markings indicating predetermined points in the intersections, such as ones indicating the centers of the intersections.

It is an object of the present invention to provide an apparatus for generating a map that can detect from a bird's-eye view image an intersection having no road marking indicating its center.

As an aspect of the present invention, an apparatus for generating a map is provided. The apparatus includes a processor configured to: detect road areas representing roads from a bird's-eye view image, detect skeletal lines of the road areas and detects individual branch points of the skeletal lines as candidates for the centers of intersections, detect candidate intersection areas for the respective candidates for the centers of intersections from the bird's-eye view image, and detect two or more of the candidate intersection areas that at least partially overlap each other as a single intersection area. The candidate intersection areas respectively include the candidates for the centers.

It is preferable that the processor of the apparatus is further configured to detect a road marking formed across a road from the bird's-eye view image. Further, the processor preferably detects the two or more of the candidate intersection areas that at least partially overlap each other as separate intersection areas when the road marking exists between the candidates for the centers of the two or more of the candidate intersection areas.

It is preferable that the processor of the apparatus is further configured to detect, from among the candidates for the centers of intersections, a plurality of candidates connected by the skeletal lines to form a closed curve, and determine whether the closed curve is approximated by a circle centered at the centroid of the detected plurality of candidates. Further, the processor preferably detects an area including the detected plurality of candidates as an area representing a rotary when the closed curve is approximated by a circle.

Additionally, it is preferable that the processor of the apparatus is further configured to detect a road edge or a road marking indicating a road edge from the bird's-eye view image. The processor preferably does not detect one of the candidate intersection areas corresponding to one of the candidates for the centers of intersections as the intersection area when one of the skeletal lines passing through the one of the candidates for the centers crosses the road edge or the road marking indicating a road edge along another of the skeletal lines passing through the one of the candidates for the centers.

Alternatively, the bird's-eye view image preferably includes altitude information indicating real-space altitudes of locations represented in respective pixels of the bird's-eye view image. The processor of the apparatus preferably does not detect one of the candidate intersection areas corresponding to one of the candidates for the centers of intersections as the intersection area when a difference between a real-space altitude of a location corresponding to a position on one of the skeletal lines passing through the one of the candidates for the centers and a real-space altitude of a location corresponding to a position on another of the skeletal lines passing through the one of the candidates for the centers is not less than a predetermined altitude difference threshold.

As another aspect of the present invention, a method for generating a map is provided. The method includes detecting road areas representing roads from a bird's-eye view image, detecting skeletal lines of the road areas and detecting individual branch points of the skeletal lines as candidates for the centers of intersections, and detecting candidate intersection areas for the respective candidates for the centers of intersections from the bird's-eye view image and detecting two or more of the candidate intersection areas that at least partially overlap each other as a single intersection area. The candidate intersection areas respectively include the candidates for the centers and each represent an intersection.

As still another aspect of the present invention, a non-transitory recording medium that stores a computer program for generating a map is provided. The computer program includes instructions causing a computer to execute a process including detecting road areas representing roads from a bird's-eye view image, detecting skeletal lines of the road areas and detecting individual branch points of the skeletal lines as candidates for the centers of intersections, and detecting candidate intersection areas for the respective candidates for the centers of intersections from the bird's-eye view image and detecting two or more of the candidate intersection areas that at least partially overlap each other as a single intersection area. The candidate intersection areas respectively include the candidates for the centers and each represent an intersection.

The apparatus according to the present invention has an advantageous effect of being able to detect from a bird's-eye view image an intersection having no road marking indicating its center.

BRIEF DESCRIPTION OF DRAWINGS

FIG. 1 illustrates the hardware configuration of an apparatus for generating a map according to an embodiment.

FIG. 2 is a functional block diagram of a processor of the apparatus for generating a map according to an embodiment.

FIG. 5A illustrates an example of a generated lane network.

FIG. 5B illustrates an example of a generated lane network.

FIG. 7 is a functional block diagram of a processor of the apparatus for generating a map according to a modified example.

DESCRIPTION OF EMBODIMENTS

Figure 3:
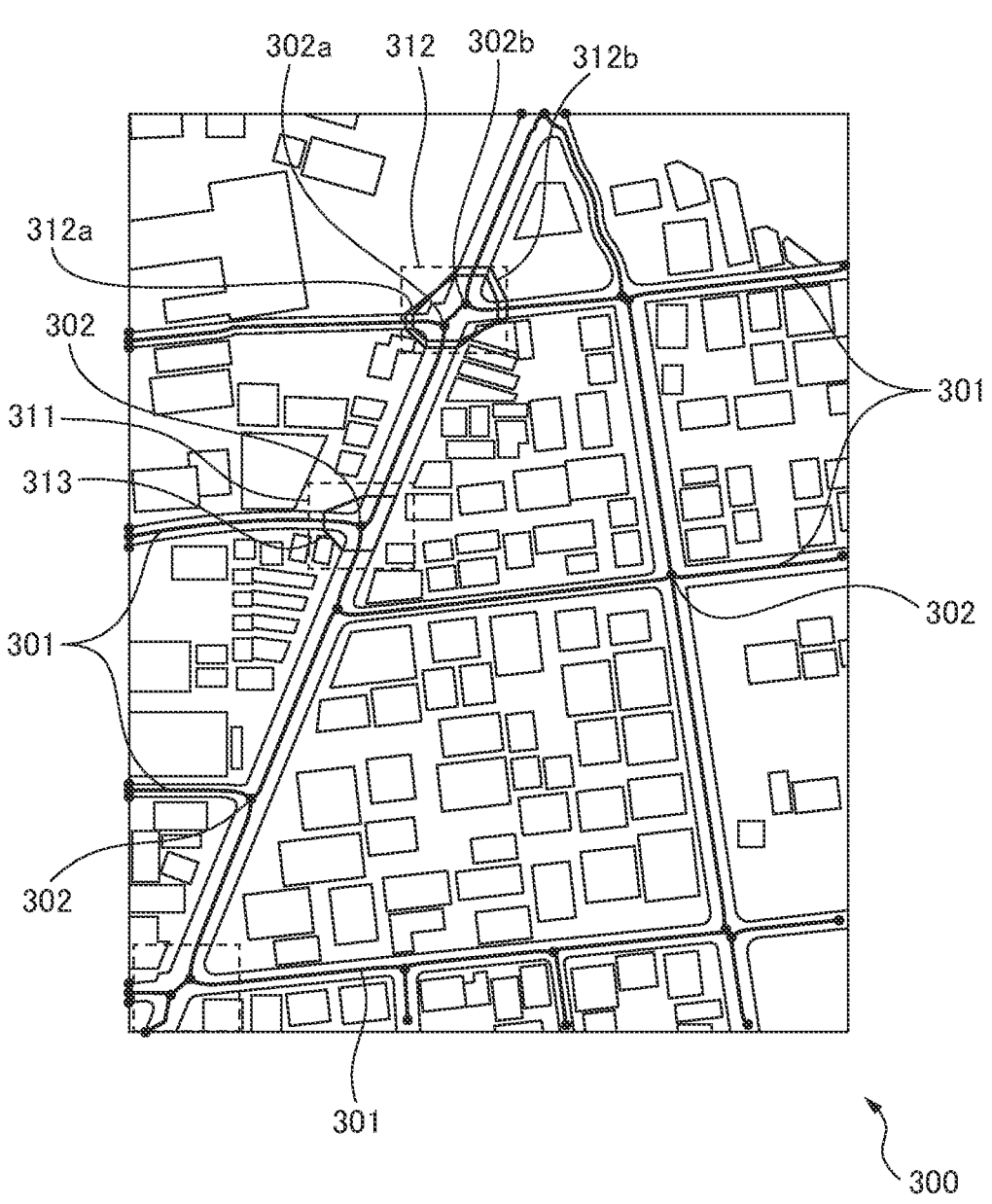
FIG. 3 is a diagram for briefly explaining detection of candidates for the centers of intersections by a skeletonizing or thinning process.

Hereinafter, an apparatus for generating a map as well as a method and a computer program therefor used by the apparatus will be described with reference to the drawings. The apparatus detects a stop line of an intersection and an intersection area including the intersection and roads connected to the intersection from a bird's-eye view image representing roads. To this end, the apparatus detects skeletal lines of road areas representing roads in the bird's-eye view image, and uses individual branch points of the skeletal lines as candidates for the centers of intersections. Additionally, the apparatus detects candidate intersection areas for the respective candidates for the centers of intersections from the bird's-eye view image. The apparatus then detects candidate intersection areas that do not overlap other candidate intersection areas as intersection areas, and detects two or more candidate intersection areas that at least partially overlap as a single intersection area. The apparatus further generates a lane network representing the connection relationship between lanes in an intersection so as to connect, for each of the roads connected to the intersection, an entry lane of the road to an exit lane of another of the roads to which a vehicle is allowed to proceed from the entry lane of the road.

In the embodiment or modified examples described below, a bird's-eye view image that is a target for a map generation process and that represents roads may be, for example, an image of the ground taken from above and identifiably representing individual road markings on the roads, e.g., an image representing a high-resolution satellite or aerial photograph. In the following description, a target aerial image for the map generation process may be simply referred to as an image.

FIG. 1 illustrates the hardware configuration of an apparatus for generating a map according to an embodiment. As illustrated in FIG. 1, an apparatus 1 for generating a map includes a communication interface 2, an input device 3, a display 4, a memory 5, a storage medium access device 6, and a processor 7.

The communication interface 2 includes a communication interface and a control circuit thereof that are compliant with a communication standard, such as Ethernet (registered trademark), and used for connection to a communication network. The communication interface 2 receives various types of information or data from another device (not illustrated) connected via the communication network, and passes them to the processor 7. The data that the communication interface 2 receives may include an image that is a target for the map generation process and that represents roads, and information indicating the geographical area represented in the image, such as the latitude and longitude of a predetermined position in the region represented in the image (e.g., its upper left end or center), the real-space horizontal and vertical sizes of this region, and a bearing. The communication interface 2 may output a road map received from the processor 7, which is an example of map information obtained by executing the map generation process, to another device via the communication network.

The input device 3 includes, for example, a keyboard and a pointing device, such as a mouse. The input device 3 generates an operation signal in response to an operation by a user, such as an operation for selecting a target image of the map generation process, for giving instructions to start execution of the map generation process, or for causing a generated road map to appear on the display 4, and outputs the operation signal to the processor 7.

The display 4 includes, for example, a liquid crystal display or an organic electroluminescent display. The display 4 displays data for display received from the processor 7, such as data representing candidates for a target image for the map generation process, or a generated road map or a portion thereof.

The input device 3 and the display 4 may be integrated into a single device like a touch screen display.

The memory 5, which is an example of a storage unit, is composed of, for example, a readable-writable semiconductor memory and a read-only semiconductor memory. The memory 5 stores, for example, a computer program for the map generation process executed by the processor 7, various types of data used in this process, such as a set of parameters for specifying a classifier used in the map generation process, and various types of data generated during execution of this process. The memory 5 may further store a target image for the map generation process and information indicating the geographical area represented in the image. The memory 5 may further store a generated road map.

The storage medium access device 6 accesses a storage medium 8, such as a magnetic disk, a semiconductor memory card, and an optical storage medium. The storage medium access device 6 together with the storage medium 8 constitutes another example of a storage unit. The storage medium access device 6 reads data stored in the storage medium 8, such as a computer program for the map generation process to be executed on the processor 7 or a target image for the map generation process, and passes it to the processor 7. Alternatively, the storage medium access device 6 may receive a generated road map from the processor 7, and write the road map to the storage medium 8.

The processor 7, which is an example of a processing unit, includes, for example, one or more CPUs and a peripheral circuit thereof. The processor 7 may further include arithmetic circuits for numerical operation, graphics processing, and logical operation. The processor 7 controls the overall operation of the apparatus 1, and executes the map generation process on an image that is a target for this process and that represents roads.

Figure 2:
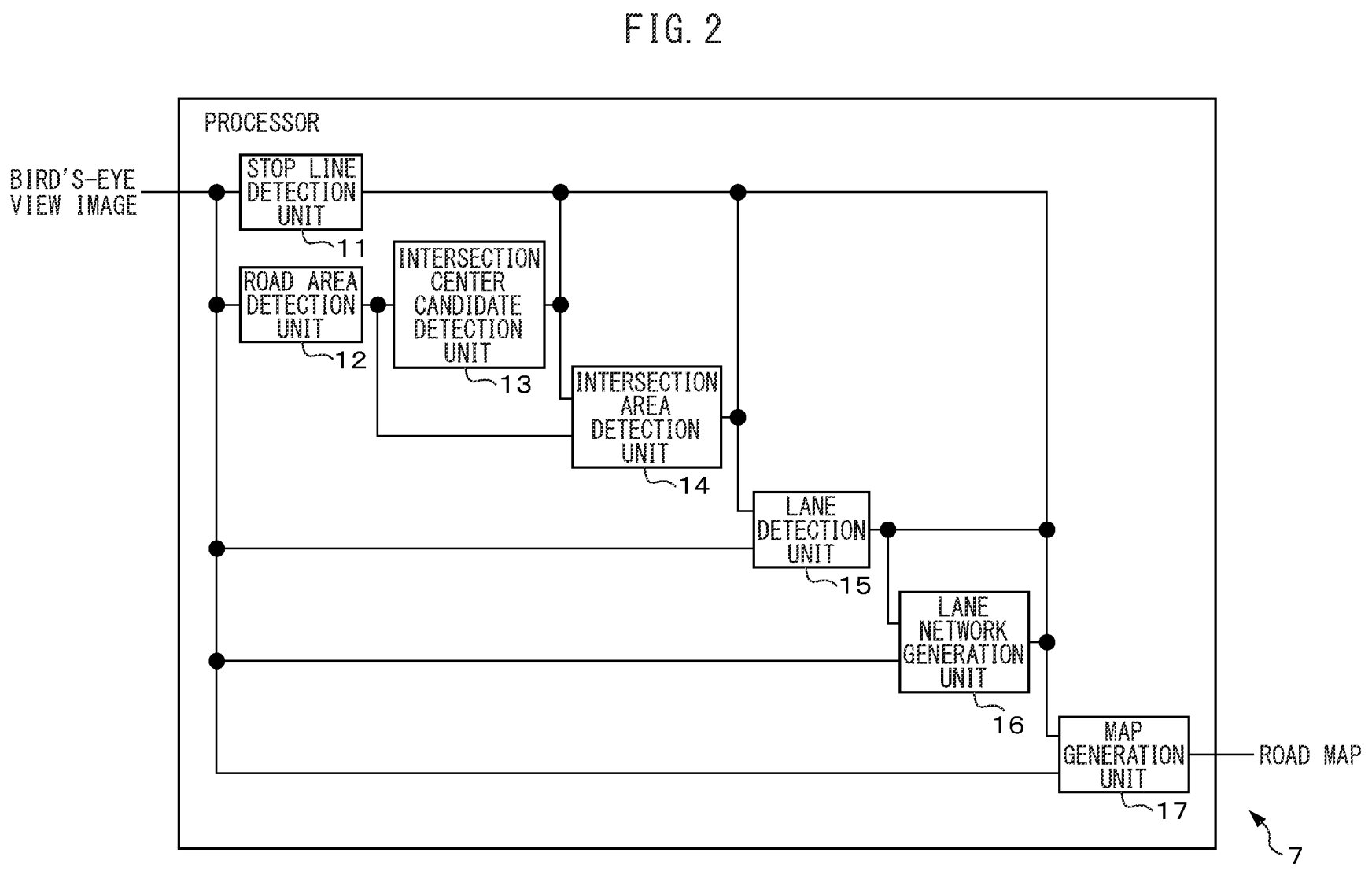

FIG. 2 is a functional block diagram of the processor 7, related to the map generation process. As illustrated in FIG. 2, the processor 7 includes a stop line detection unit 11, a road area detection unit 12, an intersection center candidate detection unit 13, an intersection area detection unit 14, a lane detection unit 15, a lane network generation unit 16, and a map generation unit 17. These units included in the processor 7 are, for example, functional modules implemented by a computer program executed on the processor 7, or may be dedicated arithmetic circuits provided in the processor 7.

The stop line detection unit 11 detects individual stop lines represented in an image. To achieve this, for example, the stop line detection unit 11 inputs the image into a classifier that has been trained to detect stop lines from an image, thereby detecting individual stop lines. As such a classifier, the stop line detection unit 11 may use, for example, a "deep neural network" (DNN) having a convolutional neural network (CNN) architecture. More specifically, such a classifier may be, for example, a CNN for semantic segmentation, e.g., a fully convolutional network (FCN), U-Net, or PSPNet, or a CNN for instance segmentation, e.g., Mask-RCNN. Alternatively, such a classifier may be a CNN for object detection, e.g., Single Shot MultiBox Detector (SSD) or Faster R-CNN. Additionally, such a classifier may be one conforming to a machine learning technique other than a neural network, e.g., Ada-Boost. Alternatively, the stop line detection unit 11 may detect stop lines in accordance with a technique other than machine learning, such as template matching.

The stop line detection unit 11 notifies information indicating the positions and sizes of the detected individual stop lines in the image to the intersection area detection unit 14, the lane detection unit 15, and the map generation unit 17.

The road area detection unit 12 detects road areas representing roads from the image. To achieve this, for example, the road area detection unit 12 inputs the image into a classifier that has been trained to detect road areas representing roads from an image, thereby detecting road areas. As such a classifier, the road area detection unit 12 may use a classifier similar to that described in relation to the stop line detection unit 11, e.g., a CNN for semantic segmentation or instance segmentation.

The road area detection unit 12 notifies information indicating the detected road areas to the intersection center candidate detection unit 13 and the intersection area detection unit 14.

The classifier used by the stop line detection unit 11 may be trained in advance to detect not only stop lines but also road areas from an image. In this case, the intersection center candidate detection unit 13 receives information indicating the positions and sizes of road areas in the image together with information indicating those of stop lines from the stop line detection unit 11. In this case, the stop line detection unit 11 is another example of the road area detection unit.

The intersection center candidate detection unit 13 detects candidates for the centers of individual intersections represented in the image. In the present embodiment, the intersection center candidate detection unit 13 applies a skeletonizing process to the detected road areas to obtain a skeleton network representing the connection relationship between roads. This causes each road to be represented by a single skeletal line, and thus an intersection becomes a node where skeletal lines cross. The intersection center candidate detection unit 13 detects individual nodes of orders not less than three that represent branch points of the skeletal lines, as candidates for the centers of intersections. Instead of skeletonizing the road areas, the intersection center candidate detection unit 13 may execute a thinning process on the road areas to obtain a thinned skeletal-line network representing the connection relationship between roads. In this case also, the intersection center candidate detection unit 13 may similarly detect nodes of orders not less than three as candidates for the centers of intersections. The use of such a network enables the intersection center candidate detection unit 13 to detect a candidate for the center of an intersection even if it has no intersection mark indicating its center position, enabling appropriately setting an intersection area even for such an intersection.

FIG. 3 is a diagram for briefly explaining detection of candidates for the centers of intersections by the skeletonizing or thinning process. As illustrated in FIG. 3, skeletonizing or thinning road areas represented in an image 300 yields a skeletonized or thinned network 301, in which nodes 302 of orders not less than three have appeared at individual intersections. This suggests that the nodes 302 will be detected as candidates for the centers of intersections.

Alternatively, the intersection center candidate detection unit 13 may execute processing for creating a Voronoi tessellation on the road areas with individual pixels representing road edges used as generators. In this case, Voronoi edges will be drawn close to the centers of respective roads and thus represent skeletal lines of the road areas, and Voronoi points where Voronoi edges cross will appear at intersections. Thus the intersection center candidate detection unit 13 may detect the Voronoi points as candidates for the centers of intersections. In this case also, the intersection center candidate detection unit 13 can detect a candidate for the center of an intersection even if it has no intersection mark, enabling appropriately setting an intersection area even for such an intersection.

The intersection center candidate detection unit 13 passes information indicating the road areas and the positions of the detected candidates for the centers of individual intersections to the intersection area detection unit 14.

The intersection area detection unit 14 detects, for each intersection represented in the image, a predetermined area including the intersection and roads connected to the intersection (hereafter simply an "intersection area").

To achieve this, the intersection area detection unit 14 detects, for each of the candidates for the centers of intersections, a candidate intersection area including the candidate for the center from the image. Of the detected candidate intersection areas, the intersection area detection unit 14 detects those which do not overlap other candidate intersection areas as intersection areas. Additionally, the intersection area detection unit 14 detects two or more of the candidate intersection areas that at least partially overlap each other as a single intersection area.

In the present embodiment, the intersection area detection unit 14 detects a candidate intersection area for each of the candidates for the centers of intersections in accordance with the following procedure.

The intersection area detection unit 14 sets scan lines drawn radially from the candidate for the center of an intersection of interest at equiangular intervals, and detects, for each scan line, the position where the scan line crosses a border between a road area and another region (hereafter, a "road edge") or an extension of a stop line to a road edge, as an outer edge of a candidate intersection area. Determining outer edges of a candidate intersection area in this way results in the candidate intersection area including stop lines of roads connected to the intersection, facilitating determination of the number of lanes included in each road connected thereto.

Regarding a scan line that does not cross a stop line nor a line like that described above between the candidate for the center of the intersection of interest and a preset farthest end, the intersection area detection unit 14 detects the position of the farthest end as a candidate for an outer edge of the candidate intersection area. In a road where the position of the farthest end is a candidate for an outer edge, the intersection area detection unit 14 gradually brings an outer-edge candidate line on which candidates for the outer edge align nearer to the candidate for the center of the intersection of interest. Then, when the length of the outer-edge candidate line becomes longer than the immediately preceding length thereof at a predetermined ratio or more, it sets the outer edge of the candidate intersection area on a line farther from the candidate for the center of the intersection of interest than this outer-edge candidate line by a predetermined number of pixels. In this way, the intersection area detection unit 14 can include in a candidate intersection area a portion where a road having no stop line is connected to an intersection. This allows for appropriately setting a lane network related to the road having no stop line.

The intersection area detection unit 14 detects an area surrounded by a line connecting the outer edges set on the roads connected to the intersection as a candidate intersection area.

Figures 4A, 4B, 4C:
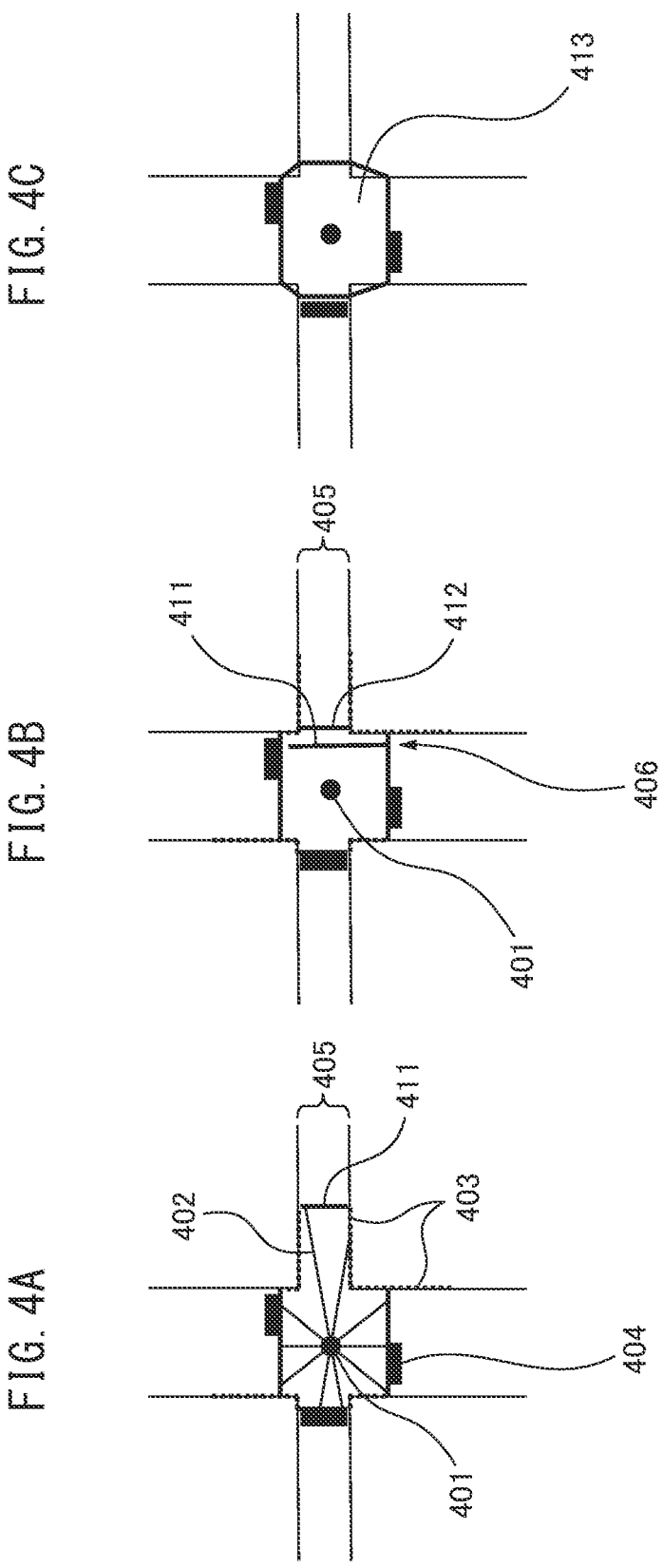
FIG. 4A is a diagram for briefly explaining detection of a candidate intersection area.
FIG. 4B is a diagram for briefly explaining detection of a candidate intersection area.
FIG. 4C is a diagram for briefly explaining detection of a candidate intersection area.

FIGS. 4A to 4C are diagrams for briefly explaining detection of a candidate intersection area. As illustrated in FIG. 4A, for each scan line 402 set radially from a candidate 401 for the center of an intersection, the position where the scan line 402 crosses a road edge 403 or an extension of a stop line 404 to a road edge 403 is set as an outer edge of a candidate intersection area. However, in a road 405 on the right of the candidate 401 for the center of the intersection, an outer-edge candidate line 411 of the candidate intersection area is set at the position of a preset farthest end because it has no stop line.

As illustrated in FIG. 4B, when the outer-edge candidate line 411 in the road 405 is gradually brought nearer to the candidate 401 for the center of the intersection, at a position 406 the length of this line becomes longer at a predetermined ratio or more than the immediately preceding length thereof. Thus an outer-edge candidate line farther from the candidate 401 for the center of the intersection than the position 406 by a predetermined number of pixels is set in the road 405 as an outer edge 412 of the candidate intersection area.

As illustrated in FIG. 4C, the area surrounded by outer edges set in the respective roads is a candidate intersection area 413 in the end.

With reference to FIG. 3 again, for example, at an intersection 311 only one candidate 302 for the center of the intersection is detected whereas at an intersection 312 two candidates 302a and 302b for the center of the intersection are detected. A candidate intersection area 312a set for the candidate 302a for the center of the intersection partially overlaps each other a candidate intersection area 312b set for the candidate 302b for the center of the intersection. This is because skeletal lines of road areas tend to have a plurality of nodes of orders not less than three at an intersection with a low degree of symmetry like the intersection 312 or at an intersection where many roads cross, such as a five-way intersection. Candidate intersection areas respectively set for candidates for the center of such an intersection detected from the intersection at least overlap because they are set for the same intersection.

Thus, of the detected candidate intersection areas, the intersection area detection unit 14 detects those which do not overlap other candidate intersection areas as intersection areas, and detects two or more candidate intersection areas that at least partially overlap each other as a single intersection area. To this end, the intersection area detection unit 14 may detect one of the two or more overlapping candidate intersection areas or the area of a union or a product set of the overlapping candidate intersection areas as an intersection area. For example, at the intersection 311 in the example illustrated in FIG. 3, a candidate intersection area 313 set for a candidate 302 for the center of the intersection is detected as a single intersection area because it does not overlap other candidate intersection areas. In contrast, since the candidate intersection areas 312a and 312b respectively set for the candidates 302a and 302b for the center of an intersection partially overlap each other, the whole area of a union of the candidate intersection areas 312a and 312b is detected as a single intersection area.

The intersection area detection unit 14 notifies information indicating detected individual intersection areas in the image to the lane detection unit 15, the lane network generation unit 16, and the map generation unit 17.

The lane detection unit 15 detects, for each detected intersection area, at least either one of an entry lane for entering the intersection included therein and an exit lane for exiting the intersection in each road connected to the intersection.

For example, when the length of a stop line of a road of interest is not greater than the value of the road width multiplied by a predetermined factor (e.g., 0.5), the lane detection unit 15 determines that the road includes both an entry lane and an exit lane. When the length of a stop line is greater than the value of the road width multiplied by the predetermined factor, the lane detection unit 15 determines that the road includes only an entry lane. The lane detection unit 15 can calculate the width of the road of interest as the distance between road edges in a direction substantially perpendicular to the lengthwise direction of the road. When lane lines are detected by one of the classifiers described above, the lane detection unit 15 determines that there are as many lanes as the number of divisions by these lane lines, for both entry lanes and exit lanes of the road of interest. Regarding a road having stop lines, the lane detection unit 15 may determine the numbers of entry lanes and exit lanes, depending on the positional relationship between the lane lines and the stop lines. For example, the lane detection unit 15 determines that one plus the number of lane lines on a road of interest which do not overlap any stop line on the road in a direction substantially perpendicular to the lengthwise direction of the road is the number of exit lanes. The lane detection unit 15 also determines that one plus the number of lane lines on the road of interest which overlap a stop line on the road in the substantially perpendicular direction is the number of entry lanes. Additionally, the lane detection unit 15 may determine a lane line within a predetermined range of the end of a stop line, in the substantially perpendicular direction, closer to the center of the road of interest as one to distinguish between entry lanes and exit lanes, and exclude it from the count of the numbers of entry lanes and exit lanes. The predetermined range is set, for example, to a size smaller than the width of a vehicle in the image.

When a single lane line is detected in a road having no stop line, the lane detection unit 15 may determine that this road includes two lanes divided by this lane line. Of these two lanes, the lane detection unit 15 may determine that one along which a vehicle is allowed to enter an intersection is an entry lane and the other is an exit lane, in accordance with the road law of the region represented in the image. Additionally, the lane detection unit 15 determines that a road where neither stop line nor lane line is detected (hereafter, referred to as a "lack-of-line road" for convenience of description) includes only an exit lane. Alternatively, the lane detection unit 15 may determine whether the lane of a lack-of-line road is an entry lane or an exit lane, based on the relationship between it and a lane included in another road connected to the same intersection. For example, the lane detection unit 15 determines that a lack-of-line road includes only an exit lane, when the intersection included in an intersection area of interest is a crossroads, the road opposite to the lack-of-line road with respect to a reference point has a stop line, and the opposite road includes only an entry lane. It may determine that a single lane included in a lack-of-line road of interest is one along which a vehicle is allowed to enter and exit the intersection included in an intersection area of interest, i.e., an entry and exit lane, when the intersection of interest is a crossroads and the road opposite to the lack-of-line road of interest with respect to a reference point is also a lack-of-line road. Depending on the presence or absence of a stop line and the ratio of the length of the stop line to the road width in this way, the lane detection unit 15 can accurately detect entry lanes and exit lanes included in roads connected to an intersection.

For each intersection area, the lane detection unit 15 notifies the lane network generation unit 16 of the numbers of entry lanes and exit lanes of each road connected to the intersection included in the intersection area.

The lane network generation unit 16 generates, for each intersection area, a lane network representing the connection relationship between lanes in the intersection included in the intersection area so as to connect, for each of the roads connected to the intersection, an entry lane of the road to an exit lane of another of the roads connected to the intersection. In this way, information indicating directions in which a vehicle is allowed to proceed on a lane-by-lane basis is obtained for each intersection.

Figures 5A, 5B:
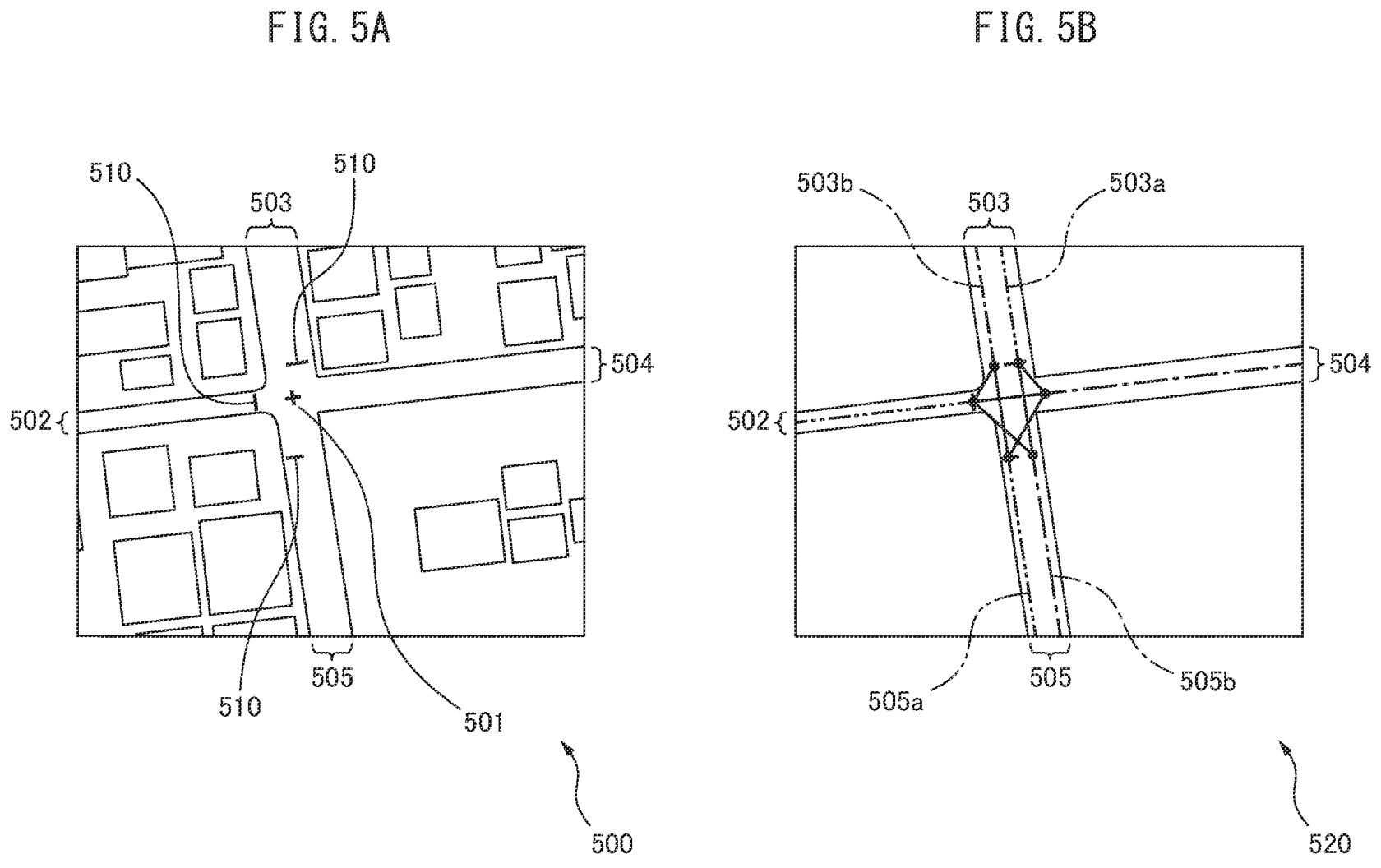

FIGS. 5A and 5B illustrate an example of a generated lane network. As illustrated in FIG. 5A, four roads 502 to 505 are connected to an intersection 501 represented in an image 500. Of these, the roads 502, 503, and 505 connected to the intersection 501 from the left, upper, and lower sides, respectively, have stop lines 510. Based on the lengths of the stop lines 510 and the widths of the roads, it is determined that the roads 503 and 505 each include an entry lane and an exit lane, and that the road 502 includes only an entry lane. The road 504 connected to the intersection 501 from the right side has no stop line, and it is determined that it includes only an exit lane.

Thus, in a lane network 520 illustrated in FIG. 5B, the entry lane of the road 502 is connected to the exit lanes of the roads 503 to 505. The entry lane 503a of the road 503 is connected to the exit lane of the road 504 and the exit lane 505b of the road 505. The exit lane 503b of the road 503 is connected to the entry lane of the road 502 and the entry lane 505a of the road 505. Similarly, the entry lane 505a of the road 505 is connected to the exit lane of the road 504 and the exit lane 503b of the road 503, and the exit lane 505b of the road 505 is connected to the entry lane of the road 502 and the entry lane 503a of the road 503. The exit lane of the road 504 is connected to the entry lanes of the roads 502, 503, and 505.

The lane network generation unit 16 notifies the map generation unit 17 of information representing the lane network of each intersection area.

The map generation unit 17 generates a map including information representing the lane network of each intersection area. Additionally, for each road detected from the image, the map generation unit 17 includes in the map the number of lanes included in the road and information on road markings formed on the lanes.

At this inclusion, the map generation unit 17 may determine, for each intersection area, the position of the intersection by referring to information indicating the geographical area represented in the target image for the map generation process and the position of the intersection area in the image, and associate positional information indicating the determined position (e.g., its latitude and longitude) with the road map. Similarly, the map generation unit 17 may divide each road into segments of a predetermined length, determine the positions of the segments by referring to information indicating the geographical area represented in the target image for the map generation process and the positions of the respective segments in the image, and associate positional information indicating the determined positions with the road map.

Additionally, the map generation unit 17 may connect road maps generated on an image-by-image basis to generate a road map of a larger area. To this end, the map generation unit 17 refers to information indicating the geographical areas represented in individual images to connect road maps obtained from the respective images so that the same position of the same road may agree.

The map generation unit 17 stores the generated road map in the memory 5 or writes it to the storage medium 8 via the storage medium access device 6. Alternatively, the map generation unit 17 may output the generated road map to another device via the communication interface 2.

Figure 6:
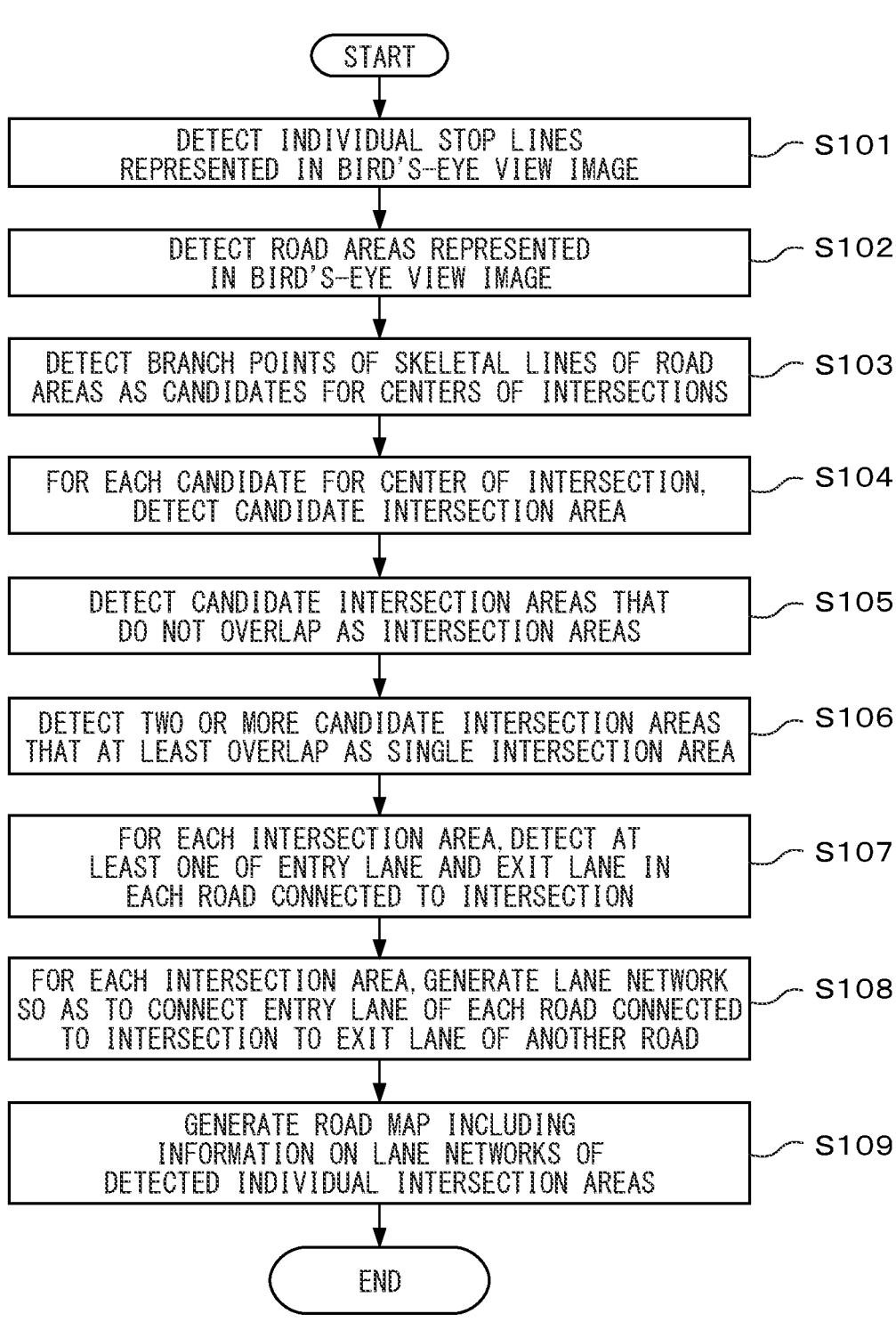
FIG. 6 is an operation flowchart of a map generation process.

FIG. 6 is an operation flowchart of the map generation process. The processor 7 executes the map generation process in accordance with the following operation flowchart for each aerial image that is a target for the map generation process.

The stop line detection unit 11 of the processor 7 detects individual stop lines represented in a bird's-eye view image (step S101). The intersection area detection unit 14 of the processor 7 detects road areas represented in the bird's-eye view image (step S102). The intersection center candidate detection unit 13 of the processor 7 detects skeletal lines of the road areas, and detects individual branch points of the skeletal lines as candidates for the centers of intersections (step S103).

For each of the candidates for the centers of intersections, the intersection area detection unit 14 of the processor 7 detects a candidate intersection area including the candidate for the center (step S104). Of the candidate intersection areas, the intersection area detection unit 14 detects those which do not overlap as intersection areas (step S105). Additionally, the intersection area detection unit 14 detects two or more of the candidate intersection areas that at least partially overlap each other as a single intersection area (step S106).

For each detected intersection area, the lane detection unit 15 of the processor 7 detects at least either one of an entry lane and an exit lane in each road connected to the intersection, based on the presence or absence of a stop line of the road and the ratio of the length of the stop line to the width of the road (step S107).

For each intersection area, the lane network generation unit 16 of the processor 7 generates a lane network so as to connect, for each of the roads connected to the intersection included in the intersection area, an entry lane of the road to an exit lane of another of the roads connected to the intersection (step S108).

The map generation unit 17 of the processor 7 generates a road map including information representing the lane network of each intersection area (step S109). Then, the processor 7 terminates the map generation process.

As has been described above, the apparatus for generating a map detects skeletal lines of road areas in a bird's-eye view image, and detects branch points of the skeletal lines as candidates for the centers of intersections. Additionally, the apparatus detects candidate intersection areas for the respective candidates for the centers of intersections. The apparatus then detects candidate intersection areas that do not overlap other candidate intersection areas as intersection areas, and detects two or more candidate intersection areas that at least partially overlap as a single intersection area. Thus the apparatus can detect from a bird's-eye view image an intersection having no road marking indicating its center.

There are intersections close to each other in some places. In such a case, candidate intersection areas detected for these intersections may partially overlap each other. However, some of the intersections may have a road marking across a road, such as a stop line or a crosswalk, and this road marking may be located between the intersections.

Thus, according to a modified example, the road area detection unit 12 inputs an image into a classifier to further detect a road marking from the image. In this case, the classifier for detecting road areas may be trained in advance to detect not only road areas but also road markings.

The intersection area detection unit 14 detects two or more candidate intersection areas that at least partially overlap each other as separate intersection areas when a road marking across a road exists between the candidates for the centers of these candidate intersection areas. This enables the apparatus to accurately detect intersections even if they are close to each other.

At a multi-level crossing of roads, a branch point of skeletal lines of road areas may be detected as a candidate for the center of an intersection. In such a case, it is preferable that no intersection area be detected for the candidate for the center of an intersection. At such a location, one of the roads crosses a border of the other road.

Thus, according to another modified example, the road area detection unit 12 inputs an image into a classifier to further detect a road marking, such as a road edge or a demarcation line indicating a road edge, from the image. In this case, the classifier for detecting road areas may be trained in advance to detect not only road areas but also road edges or road markings indicating road edges.

The intersection area detection unit 14 does not detect a candidate intersection area set for a candidate for the center of an intersection of interest as an intersection area when there is a road edge or a road marking indicating a road edge along a skeletal line passing through the candidate for the center and another skeletal line passing through the candidate for the center crosses the road edge or the road marking. In this way, the intersection area detection unit 14 can prevent a multi-level crossing of roads from being erroneously detected as an intersection area.

In some cases, an image includes altitude information indicating real-space altitudes of locations represented in respective pixels of the image. In such a case, the intersection area detection unit 14 may compare the difference between the real-space altitude of a location corresponding to a position on a skeletal line passing through a candidate for the center of an intersection of interest and the real-space altitude of a location corresponding to a position on another skeletal line passing through the candidate for the center with a predetermined altitude difference threshold. The intersection area detection unit 14 may be configured not to detect a candidate intersection area set for the candidate for the center of the intersection of interest as an intersection area when the difference regarding two locations is not less than the altitude difference threshold. In this case also, the intersection area detection unit 14 can prevent a multi-level crossing of roads from being erroneously detected as an intersection area.

Additionally, an intersection may be a rotary, depending on roads. A rotary has an annular road to which a plurality of roads is connected. The apparatus can detect a rotary by detection of such a road structure.

Figure 7:
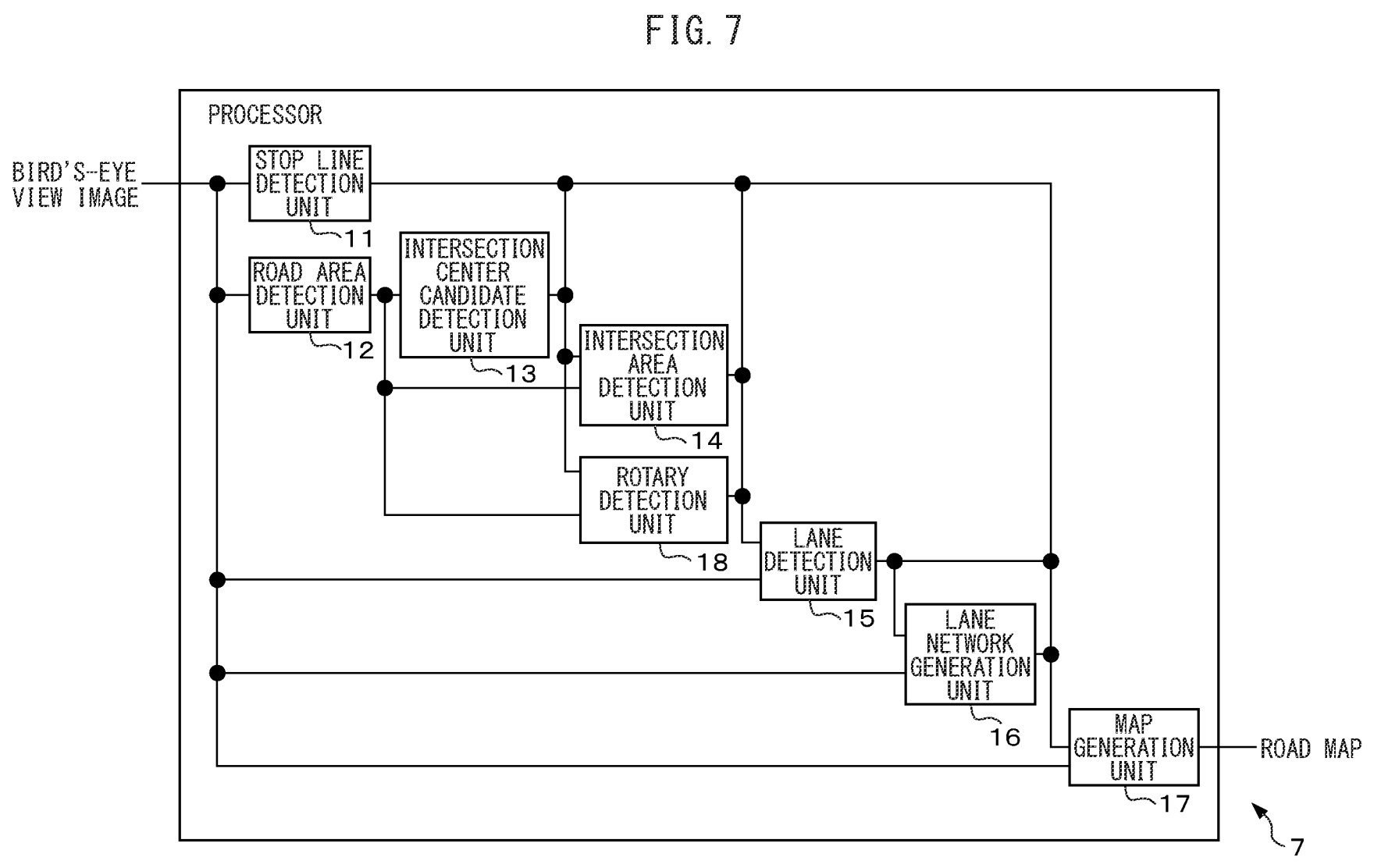

FIG. 7 is a functional block diagram of the processor 7 of the apparatus for generating a map according to this modified example. As illustrated in FIG. 7, the processor 7 includes a stop line detection unit 11, a road area detection unit 12, an intersection center candidate detection unit 13, an intersection area detection unit 14, a rotary detection unit 18, a lane detection unit 15, a lane network generation unit 16, and a map generation unit 17. These units included in the processor 7 are, for example, functional modules implemented by a computer program executed on the processor 7, or may be dedicated arithmetic circuits provided in the processor 7. This modified example differs from the embodiment in that the processor 7 includes a rotary detection unit 18. Thus the following describes the rotary detection unit 18 and the matters relevant thereto. Regarding details of the other components included in the processor 7, see the description of the corresponding components in the embodiment.

The rotary detection unit 18 detects, from candidates for the centers of intersections, a plurality of candidates connected by skeletal lines to form a closed curve. To this end, the rotary detection unit 18 may detect a combination of skeletal lines forming a closed curve from among various combinations of skeletal lines of road areas in accordance with a technique to detect a closed curve from among combinations of lines, and detect a candidate for the center of an intersection through which a skeletal line included in the detected combination passes as a candidate for the center of an intersection forming a closed curve. The rotary detection unit 18 may detect candidates for the center of the intersection forming a closed curve only when the closed curve is not longer than a predetermined length threshold corresponding to the length of the annular road of a rotary. The rotary detection unit 18 determines whether the closed curve is approximated by a circle centered at the centroid of the plurality of candidates forming the closed curve. For example, the rotary detection unit 18 may determine that the closed curve is approximated by a circle, when the least-square error between the closed curve and the circle is not greater than a predetermined threshold. When the closed curve is approximated by a circle, the rotary detection unit 18 detects an area including the plurality of candidates forming the closed curve as an area representing a rotary. For example, the rotary detection unit 18 detects, as an area representing a rotary, the area of a union of candidate intersection areas detected for the respective candidates forming the closed curve in accordance with the same technique as the intersection area detection unit 14. Alternatively, the rotary detection unit 18 may detect the center of the circle that approximates the closed curve as the center of the area representing a rotary. Then, the rotary detection unit 18 may detect a circular area having a radius obtained by adding a predetermined offset to the average of the distance from the center of the area representing a rotary to the closed curve, as the area representing a rotary.

In a rotary, it is allowed to enter the annular road from entry lanes of roads connected to the rotary and to exit the annular road to exit lanes of the roads. Thus, regarding an area representing a rotary, the lane network generation unit 16 may generate a lane network so as to connect entry lanes of roads connected to the rotary and a lane of the annular road of the rotary and to connect the lane of the annular road and exit lanes of the roads.

According to this modified example, the apparatus can detect an intersection formed as a rotary, separately from other intersections.

In an intersection, an exit from a road connected thereto may be regulated by a signpost. In such a case, since what the signpost indicates is not represented in a bird's-eye view image, it is necessary to determine, for each road connected to the intersection, whether an exit from the road is allowed, without referring to the signpost.

Thus, according to another modified example, the lane network generation unit 16 may generate a lane network of an intersection area by inputting the intersection area into a classifier that has been trained to output, for each road connected to an intersection, the connection relationship between an entry lane of the road and an exit lane of another road to which a vehicle is allowed to proceed. As such a classifier, the lane network generation unit 16 may use, for example, a Graph Parsing Neural Network (GPNN). Alternatively, to obtain a feature vector to be inputted into a GPNN from the values of pixels included in an intersection area, the lane network generation unit 16 may use a variational autoencoder (VAE) or a DNN having a CNN architecture and including a position-sensitive ROI (PSRoI) pooling layer, such as a deformable convolutional network. The lane network generation unit 16 may use a feature map generated by inputting the values of pixels in an intersection area into any of these DNNs as a feature vector to be inputted into a GPNN.

According to this modified example, the lane network generation unit 16 can appropriately generate a lane network even if an exit from an intersection to a road connected thereto is regulated by a signpost.

A computer program for causing a computer to achieve the functions of the units included in the processor of the apparatus according to the embodiment or modified examples may be provided in a form recorded on a computer-readable recording medium. The computer-readable recording medium may be, for example, a magnetic recording medium, an optical recording medium, or a semiconductor memory.

As described above, those skilled in the art may make various modifications according to embodiments within the scope of the present invention.

What is claimed is:

1. An apparatus for generating a map, comprising:
a processor configured to:
    determine one or more stop lines by at least providing a bird's-eye view image to a machine learning classifier trained to detect stop lines,
    detect road areas representing roads from the bird's-eye view image,
    detect skeletal lines of the road areas and detect individual branch points of the skeletal lines as candidates for the centers of intersections,
    detect candidate intersection areas for candidates for the centers of intersections from the bird's-eye view image based on the one or more stop lines, wherein an outer boundary of a candidate intersection area is determined by extending scan lines radially from a candidate for a center of an intersection, checking, for each of the scan lines, for (i) a border of a road area and (ii) an extension of a stop line to a road edge of the road area, and setting, for each of the scan lines, an outer edge of the candidate intersection area at a position where the scan line crosses the border or the extension, detect two or more of candidate intersection areas that at least partially overlap each other as a single combined intersection area,
    detect, for each candidate intersection area, and for each road connected to the intersection area, a number and a position of entry lanes and a number and position of exit lanes of each road, based on a length and a position of a stop line associated with each road, wherein each candidate intersection area contains at least one entry lane and at least one exit lane,
    provide the candidate intersection areas to a variational autoencoder,
    generate a lane network by the variational autoencoder, wherein the lane network connects, for each road connected to each candidate intersection area, each entry lane of the road to at least one exit lane of the at least one exit lane, and
    generate a first road map using at least the lane network.

2. The apparatus according to claim 1, wherein the processor is further configured to detect a road marking formed across a road from the bird's-eye view image, and
    the processor detects the two or more of the candidate intersection areas that at least partially overlap each other as separate intersection areas when the road marking exists between the candidates for the centers of the two or more of the candidate intersection areas.

3. The apparatus according to claim 1, wherein the processor is further configured to
    detect, from among the candidates for the centers of intersections, a plurality of candidates connected by the skeletal lines to form a closed curve,
    determine whether the closed curve is approximated by a circle centered at a centroid of the plurality of candidates, and
    detect an area including the detected plurality of candidates as an area representing a rotary when the closed curve is approximated by a the circle.

4. The apparatus according to claim 1, wherein the processor is further configured to detect a road edge or a road marking indicating a road edge from the bird's-eye view image, and
    the processor does not detect one of the candidate intersection areas corresponding to one of the candidates for the centers of intersections as the intersection area when one of the skeletal lines passing through the one of the candidates for the centers crosses the road edge or the road marking indicating a road edge along another of the skeletal lines passing through the one of the candidates for the centers.

5. The apparatus according to claim 1, wherein the bird's-eye view image includes altitude information indicating real-space altitudes of locations represented in respective pixels of the bird's-eye view image, and
    the processor does not detect one of the candidate intersection areas corresponding to one of the candidates for the centers of intersections as the intersection area when a difference between a real-space altitude of a location corresponding to a position on one of the skeletal lines passing through the one of the candidates for the centers and a real-space altitude of a location corresponding to a position on another of the skeletal lines passing through the one of the candidates for the centers is not less than a predetermined altitude difference threshold.

6. The apparatus according to claim 4, wherein the detecting the road edge or the road marking includes extending the scan lines such that the scan lines are drawn radially from each candidate intersection area at equiangular intervals.

7. The apparatus according to claim 1, wherein the processor is further configured to:

divide each road of the first road map into first segments; and determine geographical positions of the first segments based on information indicating the geographical area represented in the bird's-eye view image and positions of the first segments in the bird's-eye view image.

8. The apparatus according to claim 1, wherein the processor is further configured to:

generate a second road map based on a second bird's-eye view image; and generate a third road map based on connecting the first road map to the second road map such that a position of a road included in the first road map matches the position of the road in the second road map.

9. The apparatus according to claim 8, wherein connecting the first road map to the second road map is based on information indicating the geographical areas represented in the first bird's-eye image and the second bird's-eye image.

10. The apparatus according to claim 1, wherein there are at least four roads connected to at least one of the candidate intersection areas.

11. The apparatus according to claim 1, wherein there are at least four roads connected to the combined intersection area.

12. The apparatus according to claim 1, wherein the combined intersection area includes at least a plurality of nodes of orders not less than three.

13. The apparatus according to claim 12, wherein the combined intersection area has a low degree of symmetry.

14. The apparatus according to claim 1, wherein generating the lane network further includes generating, by the variational autoencoder, and using values of pixels in each candidate intersection area, a feature map.

15. The apparatus according to claim 1, wherein generating the lane network further includes providing the generated feature map to a graph parsing neural network.

16. A method for generating a map, comprising:

determining one or more stop lines by at least providing a bird's-eye view image to a machine learning classifier trained to detect stop lines;

detecting road areas representing roads from a bird's-eye view image;

detecting skeletal lines of the road areas and detecting individual branch points of the skeletal lines as candidates for the centers of intersections;

detecting candidate intersection areas for the respective candidates for the centers of intersections from the bird's-eye view image based on the one or more stop lines, wherein an outer boundary of a candidate intersection area is determined by extending scan lines radially from a candidate for a center of an intersection, checking, for each of the scan lines, for (i) a border of a road area and (ii) an extension of a stop line to a road edge of the road area, and setting, for each of the scan lines, an outer edge of the candidate intersection area at a position where the scan line crosses the border or the extension;

detecting two or more of candidate intersection areas that at least partially overlap each other as a single combined intersection area;

detecting, for each candidate intersection area, and for each road connected to the intersection area, a number and a position of entry lanes and a number and position of exit lanes of each road, based on a length and a position of a stop line associated with each road, wherein each candidate intersection area contains at least one entry lane and at least one exit lane;

providing the candidate intersection areas to a variational autoencoder, generating a lane network by the variational autoencoder, wherein the lane network connects, for each road connected to each candidate intersection area, each entry lane of the road to at least one exit lane of the at least one exit lane; and generating a first road map using at least the lane network.

17. A non-transitory recording medium that stores a computer program for generating a map, the computer program causing a computer to execute a process comprising:

determining one or more stop lines by at least providing a bird's-eye view image to a machine learning classifier trained to detect stop lines;

detecting road areas representing roads from a bird's-eye view image;

detecting skeletal lines of the road areas and detecting individual branch points of the skeletal lines as candidates for the centers of intersections;

detecting candidate intersection areas for the respective candidates for the centers of intersections from the bird's-eye view image based on the one or more stop lines, wherein an outer boundary of a candidate intersection area is determined by extending scan lines radially from a candidate for a center of an intersection, checking, for each of the scan lines, for (i) a border of a road area and (ii) an extension of a stop line to a road edge of the road area, and setting, for each of the scan lines, an outer edge of the candidate intersection area at a position where the scan line crosses the border or the extension;

detecting two or more of candidate intersection areas that at least partially overlap each other as a single combined intersection area;

detecting, for each candidate intersection area, and for each road connected to the intersection area, a number and a position of entry lanes and a number and position of exit lanes of each road, based on a length and a position of a stop line associated with each road, wherein each candidate intersection area contains at least one entry lane and at least one exit lane;

providing the candidate intersection areas to a variational autoencoder;

generating a lane network by the variational autoencoder, wherein the lane network connects, each entry lane of the road to at least one exit lane; and generating a first road map using at least the lane network.

* * * * *